US012096778B2

(12) United States Patent
Jarvis et al.

(10) Patent No.: US 12,096,778 B2
(45) Date of Patent: Sep. 24, 2024

(54) SPEED SENSOR FOR ANIMAL STUNNER

(71) Applicant: Jarvis Products Corporation, Middletown, CT (US)

(72) Inventors: Jonathan Jarvis, Middletown, CT (US); Trent Jones, Tabor, IA (US); Arthur Jones, Tabor, IA (US); Bruce Eidinger, Middlefield, CT (US); Kevin Catalan, Manchester, CT (US)

(73) Assignee: Jarvis Products Corporation, Middletown, CT (US)

( * ) Notice: Subject to any disclaimer, the term of this patent is extended or adjusted under 35 U.S.C. 154(b) by 0 days.

(21) Appl. No.: 17/551,591

(22) Filed: Dec. 15, 2021

(65) Prior Publication Data

US 2022/0183305 A1 Jun. 16, 2022

Related U.S. Application Data

(60) Provisional application No. 63/125,549, filed on Dec. 15, 2020.

(51) Int. Cl.
*A22B 3/02* (2006.01)

(52) U.S. Cl.
CPC ..................... *A22B 3/02* (2013.01)

(58) Field of Classification Search
CPC ................... A22B 3/00; A22B 3/02
USPC ....................................... 452/57, 62
See application file for complete search history.

(56) References Cited

U.S. PATENT DOCUMENTS

| 4,219,905 | A | * | 9/1980 | Thacker | ................... | A22B 3/02 |
| | | | | | | 452/62 |
| 4,575,900 | A | * | 3/1986 | Hamel | ..................... | A22B 3/02 |
| | | | | | | 452/62 |
| 4,625,442 | A | * | 12/1986 | Hill | .......................... | A22B 3/02 |
| | | | | | | 452/57 |
| 4,757,627 | A | * | 7/1988 | Saligari | .................... | F41C 3/16 |
| | | | | | | 42/36 |

(Continued)

FOREIGN PATENT DOCUMENTS

EP 3384778 B1 10/2020

OTHER PUBLICATIONS

"Optical Sensor Basics and Applications" (Elprocus), Aug. 8, 2020—www.elprocus.com/optical-sensors-types-basics-and applications.

(Continued)

*Primary Examiner* — David J Parsley
(74) *Attorney, Agent, or Firm* — DeLio Peterson & Curcio LLC; Robert Curcio

(57) ABSTRACT

A pneumatic animal stunner for stunning an animal for later processing uses sensor technology to measure the speed of a stunning rod disposed in the stunner housing as it is driven forward via pneumatic forces. At least one sensor may be disposed in a nose connected to a front end of the housing, in the housing, or in a tail end of the housing. The at least one sensor communicates with a receiver that can process and display the speed data collected from the at least one sensor as the stunning rod drives forward. The receiver can be disposed on the housing of the stunner, or may be a separate component from the stunner. The data may be sent from the at least one sensor to the receiver via a wireless or wired connection. Multiple methods of measuring the stunning rod speed may be employed.

27 Claims, 13 Drawing Sheets

(56) References Cited

U.S. PATENT DOCUMENTS

| | | | | |
|---|---|---|---|---|
| 5,692,951 | A | * | 12/1997 | Huff .................. A22B 3/02 |
| | | | | 452/62 |
| 6,172,684 | B1 | * | 1/2001 | Lapidous ................ G06T 11/20 |
| | | | | 345/443 |
| 7,202,658 | B2 | * | 4/2007 | Ketelaars .................. G01P 3/66 |
| | | | | 324/174 |
| 8,702,078 | B2 | * | 4/2014 | Clifford ............... B25J 15/0608 |
| | | | | 269/8 |
| 9,743,678 | B1 | | 8/2017 | Jones et al. |
| 2002/0112599 | A1 | | 8/2002 | Sabates et al. |
| 2008/0190191 | A1 | | 8/2008 | Martin et al. |

OTHER PUBLICATIONS

'9 Uses of Fiber Optic Cables (Bulgin) Sep. 6, 2018—www.rs-online.com/designspark/9-uses-of-fiber optic-cables.

\* cited by examiner

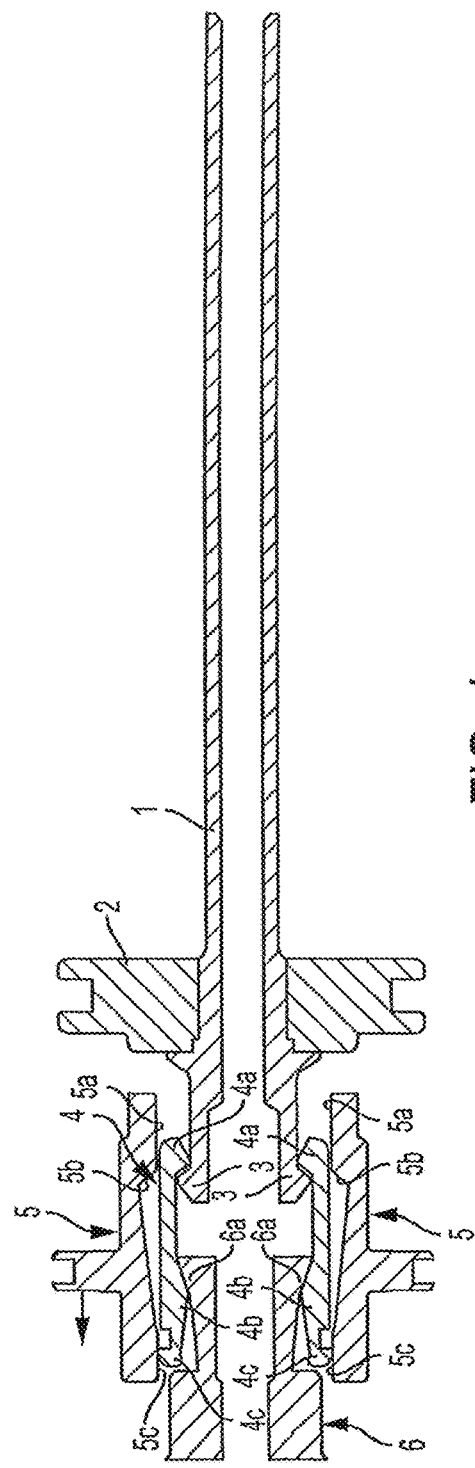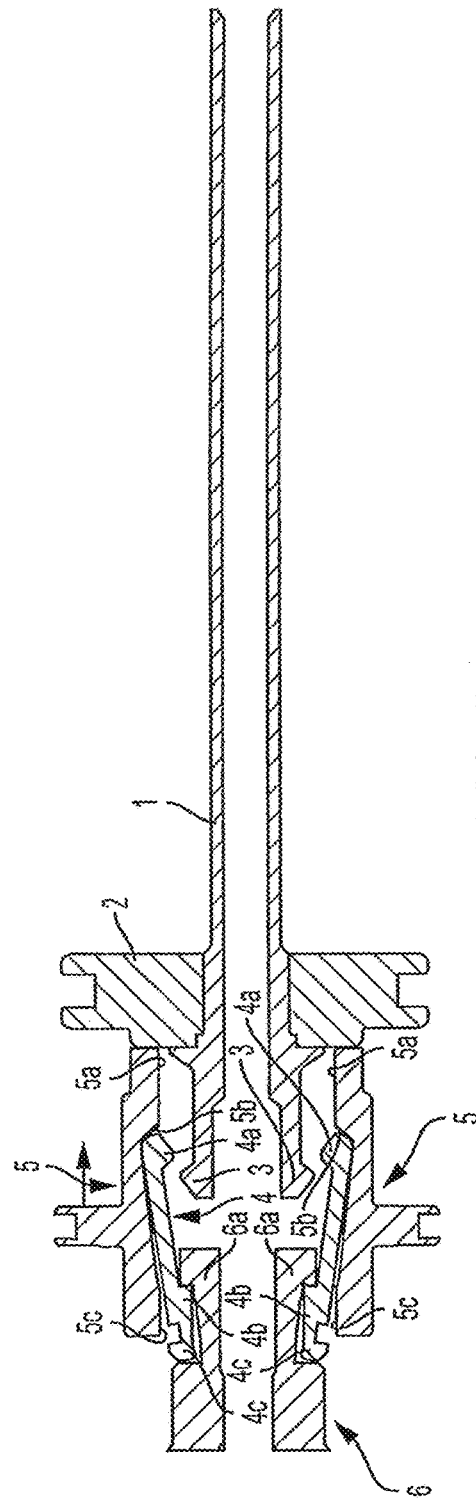

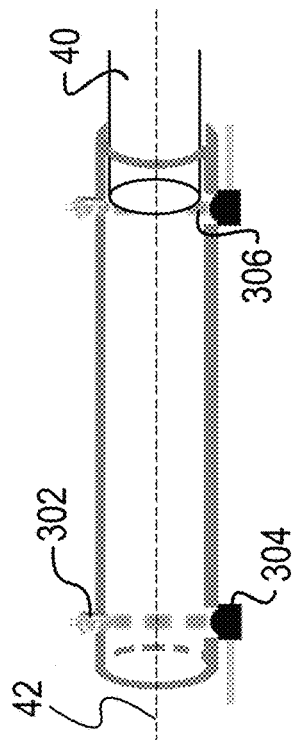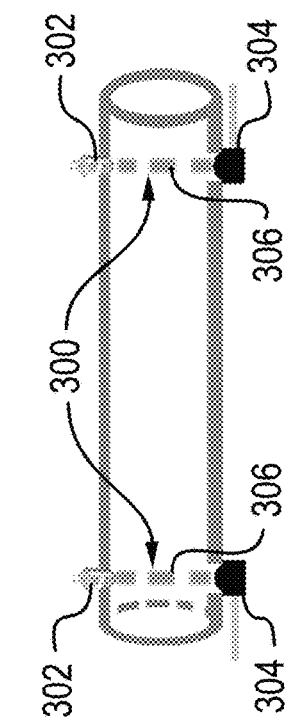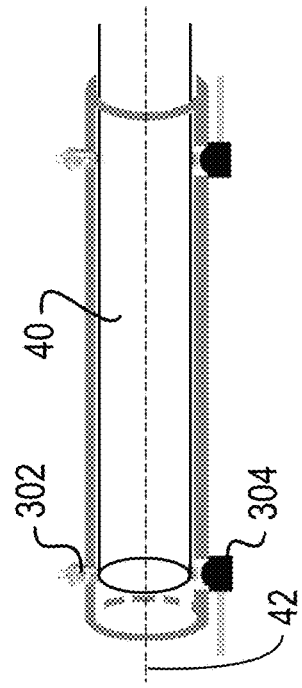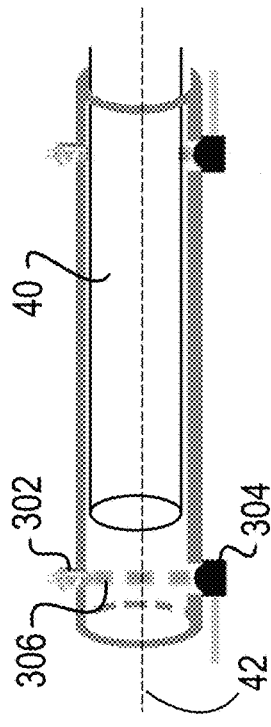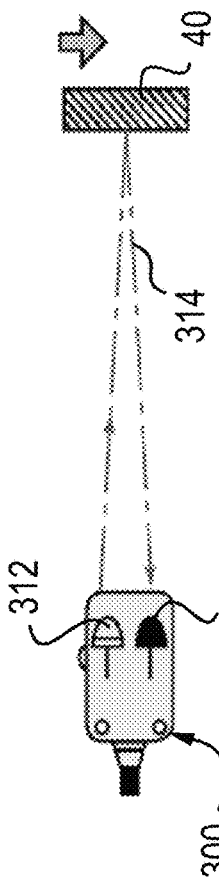

SPEED SENSOR FOR ANIMAL STUNNER

BACKGROUND OF THE INVENTION

1. Field of the Invention

The present invention relates in general to speed sensing technology for a pneumatic animal stunner used in livestock/slaughterhouse operations.

2. Description of Related Art

In livestock production plants, it is important to stun and disable an animal for processing. In livestock production farms, it is important to euthanize animals suffering from severe injury or irreversible disease so as to prevent the spread of illness, Although numerous methods have been used to stun and euthanize livestock, captive bolt mechanisms have proven to be the most efficient, inexpensive, and humane way to disable the animal. Particularly, pneumatic captive bolt devices have been used in this capacity.

U.S. Pat. No. 6,135,871 and U.S. application Ser. No. 10/417,865, the disclosures of which are hereby incorporated by reference, disclose pneumatic animal stunners that, among other things, include a physical catch for the piston that drives the stunning rod.

FIGS. 1 and 2 show a prior art catch arrangement for a stunner in which stunning rod 1 extending rightward (forward) from a piston 2 has a leftward (rearward) end with outwardly extending lips 3 that may be alternately held and released by inward extending lips at the end portion 4a of a catch 4. At a central portion of the body of catch 4 is an inwardly extending flange 4b which is pivotable about an outwardly extending flange 6a of catch pivot post 6. A catch piston 5 includes an inner bore 5a at a forward end, an inner bore 5c at a rearward end, and a relief portion 5b between the two. In the hold position of FIG. 1, the catch piston 5 is slid longitudinally rearward so that forward inner bore 5a contacts and moves catch forward end 4a toward and into engagement with stunning rod lips 3, at the same time that rearward inner bore 5c contacts the outer surface of catch rearward end 4c. In the release position of FIG. 2, the catch piston is slid longitudinally forward so that forward inner bore 5a moves forward of catch forward end 4a, and the relief portion 5b permits catch forward end 4a to move outward and out of engagement with stunning rod lips 3 as the flange 4b of catch 4 pivots about catch post pivot flange 6a. At the same time, catch piston rearward inner bore 5c slides forward and then moves out of contact with the outer surface of catch rearward end 4c. Upon release of the stunning rod lips, compressed air behind piston 2 moves stunning rod 1 forward to stun the animal.

Further views and exemplary operations of the prior art pneumatic animal stunners are provided in FIGS. 3-6, in reference to U.S. Pat. Nos. 9,661,859, 9,743,678, 9,687,003, and 9,854,815, the disclosures of which are also hereby incorporated by reference.

While some nations, including the United States, are already subject to government regulation to ensure humane euthanasia of animals, some activists have suggested further implementing an objective scoring system to ensure consistent humane animal handling and stunning practices at slaughter plants. One such article, "Objective scoring of animal handling and stunning practices at slaughter plants", by Dr. Mary Temple Grandin, discusses six quantifiable variables to ensure humane euthanasia of animals at livestock production plants. Of these, one such variable was stunning efficacy. The article details that during the 1996 survey conducted for the United States Department of Agriculture, the primary cause of an ineffective first attempt to stun an animal was due to poor stunner maintenance.

To ensure the effectiveness and maintenance of these stunners, a minimum stunning rod speed must be achieved. Issues in supplied fluid pressures, tool mechanics, or general wear and tear may cause a decrease in stunner performance and overall stunning rod speed. A stunning rod speed that is too low will also not cause a quick death to the animal, and may increase animal suffering. It would therefore be beneficial to provide a stunner capable of sensing and/or measuring its own stunning rod speed after each use so as to indicate to the end user whether stunning rod speed is falling below the necessary threshold, and thus help in preventing failure and/or breakdown of the tool and ensuring humane animal deaths.

SUMMARY OF THE INVENTION

Bearing in mind the problems and deficiencies of the prior art, it is therefore an object of the present invention to provide a pneumatic captive bolt device capable of sensing its own stunning rod speed.

It is another object of the present invention to provide a speed sensor for a pneumatic captive bolt device with wireless and/or hard wired data transmission capabilities.

A further object of the invention is to provide a stunner that is able to measure stunning rod speed to provide proper effectiveness in stunning and killing animals.

It is yet another object of the present invention to provide a stunner that operates to ensure humane animal deaths.

Still other objects and advantages of the invention will in part be obvious and will in part be apparent from the specification.

The above and other objects, which would not be apparent to those skilled in the art, are achieved in the present invention which is directed to a sensor system for a pneumatic animal stunner. The system comprises a housing having a front end, an inner chamber in the housing having a forward end and a rearward end, a piston slideable within the inner chamber, a stunning rod within the housing and capable of being driven by the piston forward and rearward towards and away from the front end of the housing, a nose disposed on the housing front end, and at least one sensor disposed within either of the housing or the nose, the at least one sensor being in communication with a receiver. The at least one sensor measures an event to determine a movement speed of the stunning rod as it is driven forward by the piston towards the front end of the housing, and further transmits said movement speed to the receiver for display.

In an embodiment, the receiver may be a separate unit from the pneumatic animal stunner. The receiver may be integral to the pneumatic animal stunner. The at least one sensor may be a mechanical, optical, magnetic, or proximity sensor. The at least one sensor may be a proximity sensor, wherein said proximity sensor emits an electromagnetic field or a beam of electromagnetic radiation. The at least one sensor may be a visible light fiber optic sensor, a focused laser transmitter and photodiode sensor, an infrared light sensor, or an inductive proximity sensor. The at least one sensor may be disposed on the tail end of the housing. A plurality of sensors may be disposed within either of the housing or the nose.

These plurality of sensors may further be disposed on the nose, adjacent to each other on a shared longitudinal axis. Alternatively, the plurality of sensors may be disposed radially on the nose. The event measured by the at least one sensor may be a change in time. The at least one sensor may be a break beam sensor. Alternatively, the at least one sensor may be a reflective light sensor.

In another aspect, the present invention may be directed to a method of sensing the speed of a stunning rod of a pneumatic animal stunner. The method provides a housing having a front end, an inner chamber in the housing having a forward end and a rearward end, a piston slidable within the inner chamber, a stunning rod within the housing and capable of being driven by the piston forward and rearward towards and away from the front end of the housing, a nose disposed on the housing front end, and at least one sensor disposed within either of the housing or the nose, where the at least one sensor is in communication with a receiver. The steps of the method include firing the stunning rod to drive it forward towards the front end of the housing; measuring a movement speed of the stunning rod via the at least one sensor; and transmitting the movement speed to the receiver in communication with said at least one sensor.

In an embodiment, the method may further define the step of measuring the movement speed of the stunning rod being conducted via a plurality of sensors. The plurality of sensors may further be radially placed on the stunner housing or nose. The plurality of sensors may alternatively be axially placed on the stunner housing or nose. The step of measuring the movement speed of the stunning rod may further include measuring a first event signal, subsequently measuring a second event signal, and using said first event signal and said second event signal to determine said movement speed of the stunning rod. The step of transmitting the movement speed to the receiver may be achieved via a wireless connection. The step of transmitting the movement speed to the receiver may be achieved via a wired connection. The wired connection may be via a fiber-optic cable. The method may further include measuring the movement speed of the stunning rod via the at least one sensor by employing a break beam method. Alternatively, measuring the movement speed of the stunning rod via the at least one sensor may be completed by employing a reflected light method.

In yet another aspect, the present invention may be directed to a stunner nose for determining the speed of a stunning rod, the stunner nose for installation on a stunner comprising a housing having a front end, a rear end, and an opening therethrough, said opening having a stunning rod disposed therein and slidable within said stunner housing between said front end and said rear end. The stunner nose comprises a bore on the outside surface of the nose to receive a sensor therein, and said sensor within the bore is capable of detecting movement of said stunning rod within the opening of the housing after said stunner nose is installed on the stunner. The sensor records an event to determine the movement speed of the stunning rod as it is driven forward within the housing opening of the stunner in view of the sensor, and further transmits the movement speed to a receiver for display.

In an embodiment, the nose outside surface may include a second bore adjacent to said bore for receiving a second sensor therein. The sensor may be a break beam sensor. Alternatively, the sensor may be a reflective light sensor. The outside surface may include a second bore radially disposed with respect to said bore.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIGS. 1 and 2 are cross sectional views of a prior art stunner catch system in hold and release positions, respectively.

FIG. 18 is a diagrammatic side cross-sectional view of an embodiment of the stunner having the speed sensors disposed in the housing, and the stunning rod in the fully retracted position.

FIG. 19 is a diagrammatic side cross-sectional view of the speed sensors and housing of FIG. 18, with the stunning rod in the partially extended position breaking a first beam.

FIG. 20 is a diagrammatic side cross-sectional view of the speed sensors and housing of FIG. 18, with the stunning rod in a further extended position approaching a second beam.

FIG. 21 is a diagrammatic side cross-sectional view of the speed sensors and housing of FIG. 18, with the stunning rod in the fully extended position breaking the second beam.

FIG. 22 is a diagrammatic view of a speed sensor using an alternate reflected light method of measuring the speed of the stunning rod.

DESCRIPTION OF THE EMBODIMENT(S)

Figure 3:
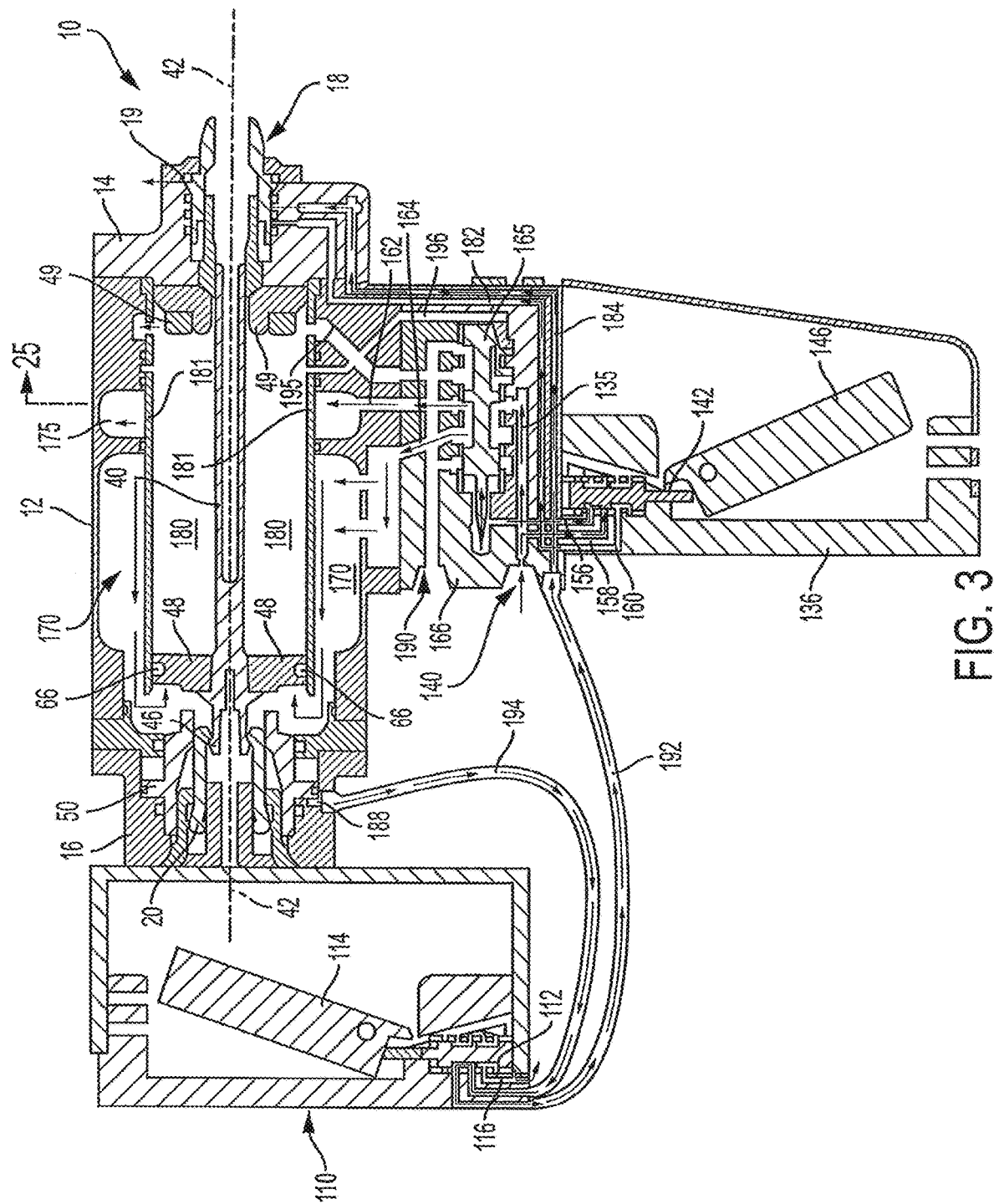
FIG. 3 is a side cross-sectional view of an animal stunner with the catch hold position, with valves in neutral position, with the air supply pressurized and prior to firing, according to the present invention.
Figure 4:
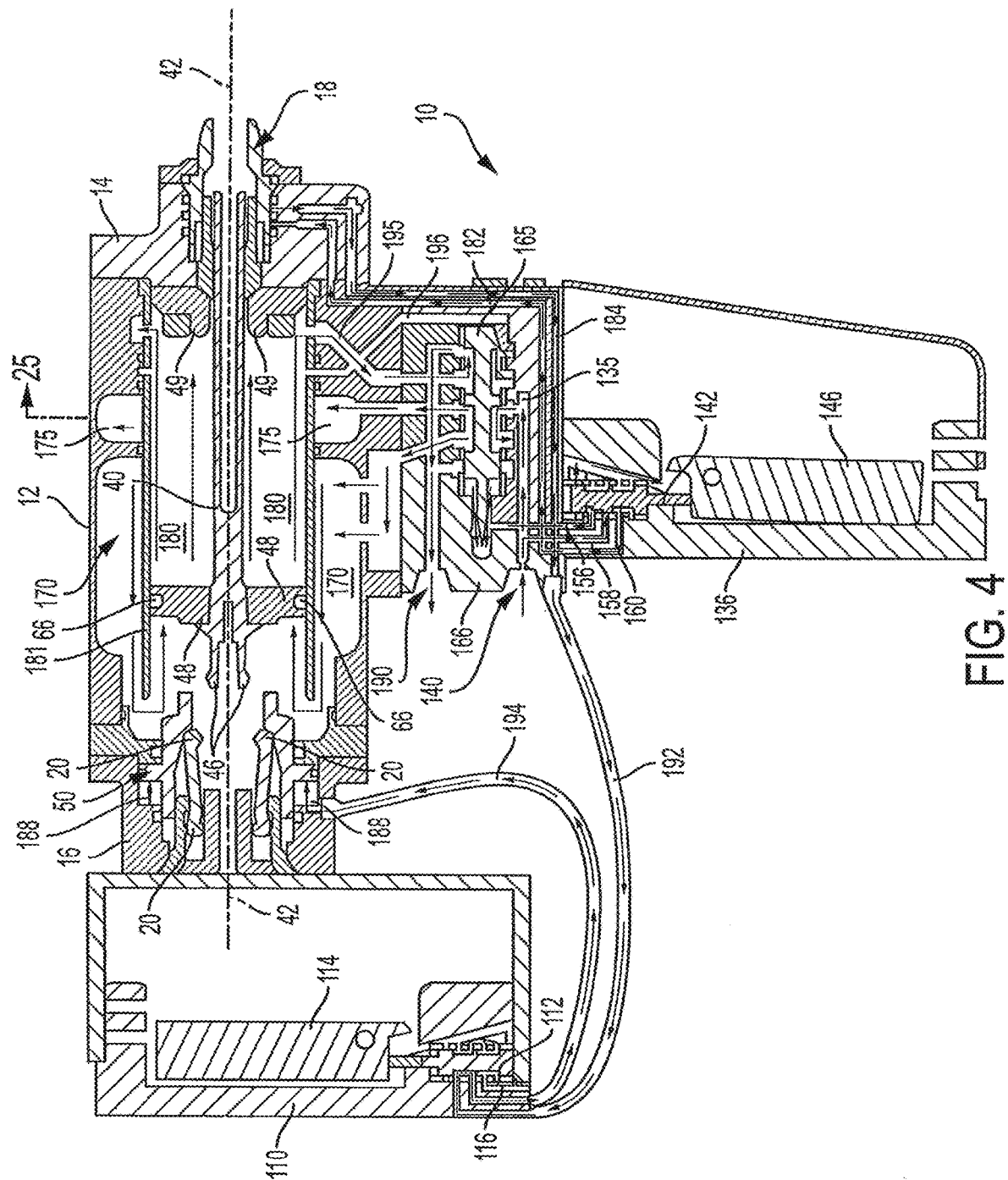
FIG. 4 is a side cross-sectional view of the animal stunner of FIG. 3 with the catch release position, with valves in the firing position, according to the present invention.
Figure 5:
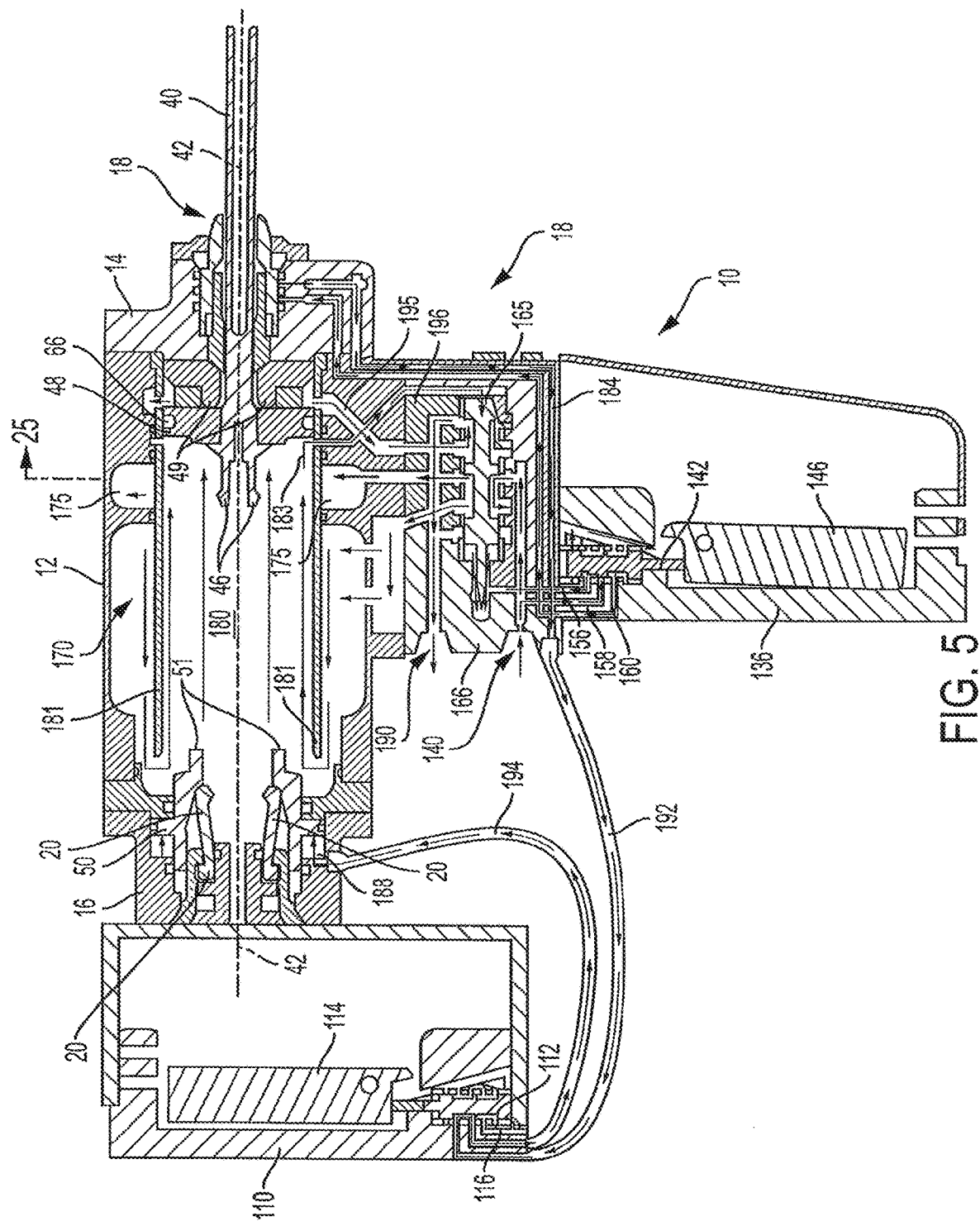
FIG. 5 is a side cross-sectional view of the animal stunner of FIG. 3 with the stunning rod in the end-of-stroke position, according to the present invention.
Figure 6:
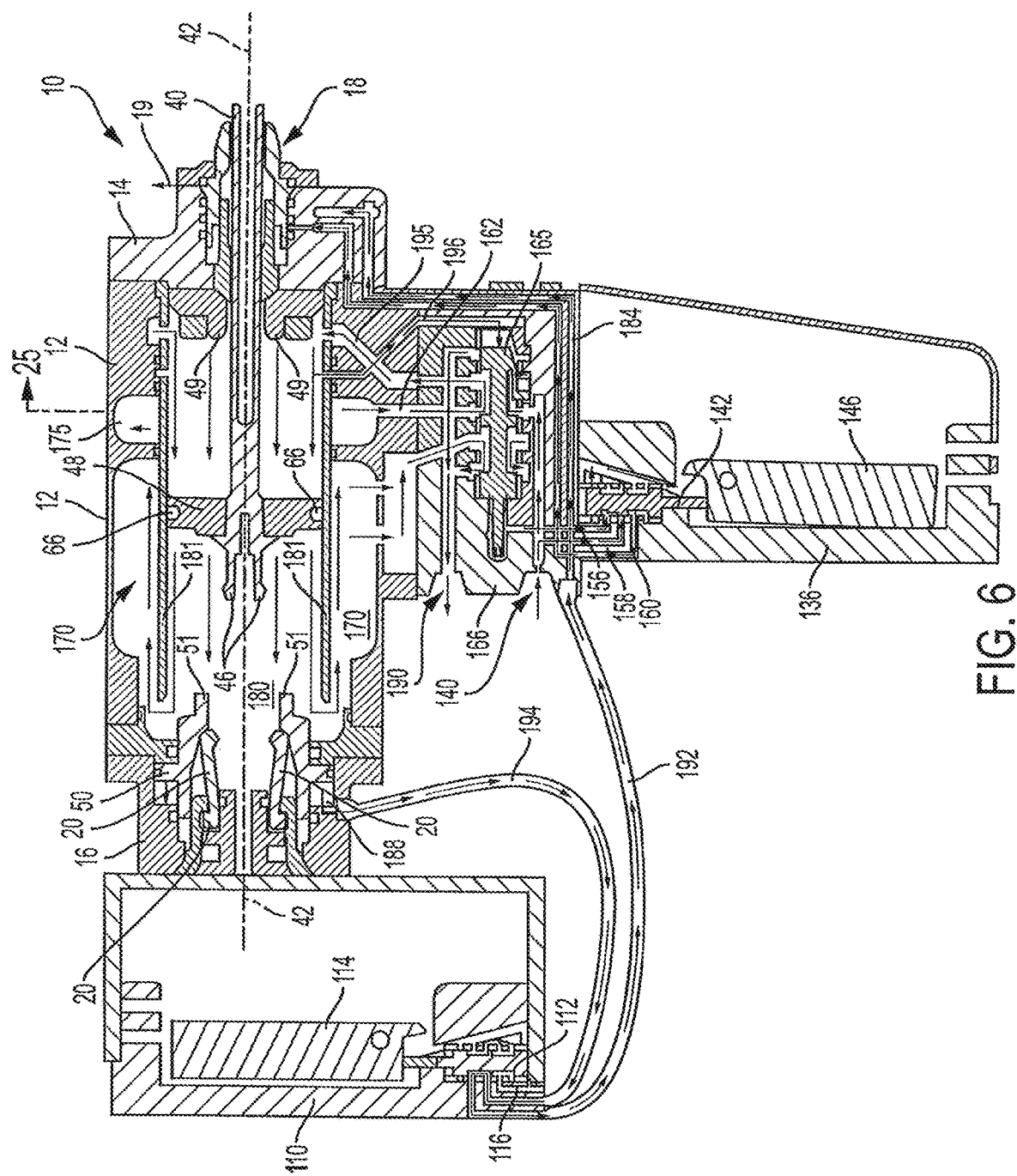
FIG. 6 is a side cross-sectional view of the animal stunner of FIG. 3 with the air in main valve in the reverse position to retract the stunning rod, according to the present invention.
Figure 7:
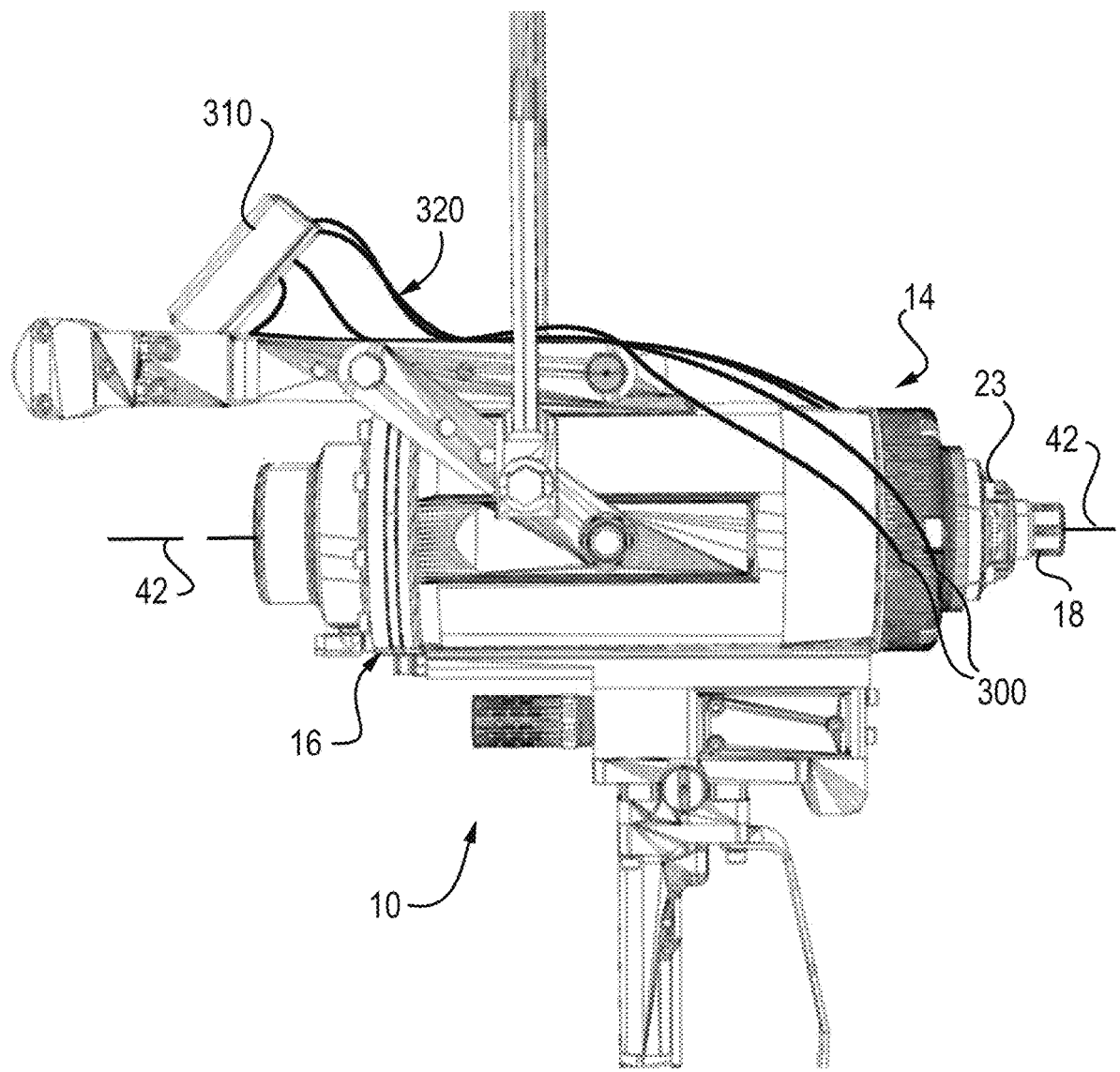
FIG. 7 is a side view of an animal stunner with speed sensors disposed radially in the nose, and the speed sensors connected to a receiver via a hard-wired connection, according to the present invention.
Figure 8:
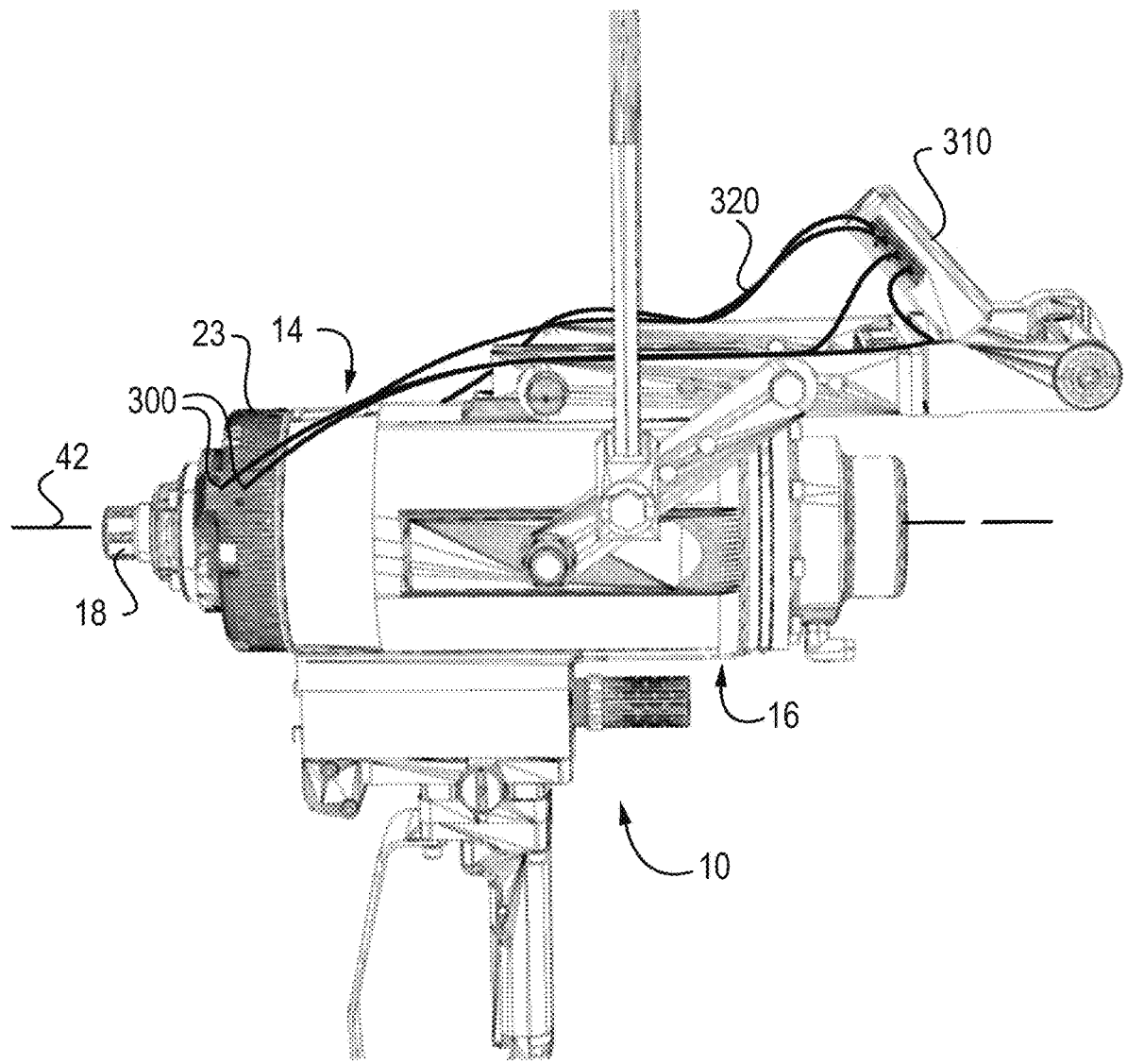
FIG. 8 is another side view of the animal stunner, speed sensors, and receiver of FIG. 7.
Figure 10:
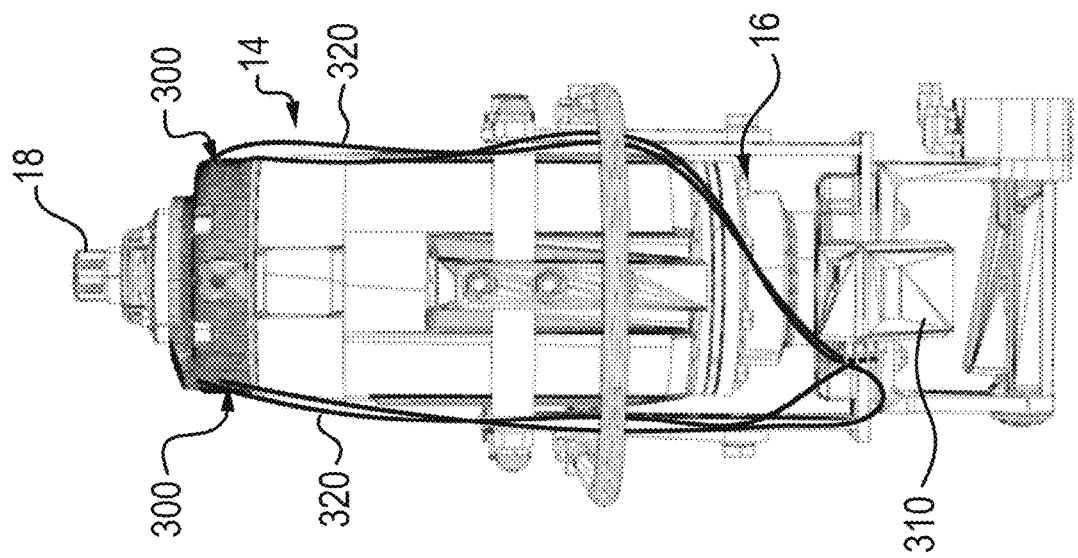
FIG. 10 is a top-down view of the animal stunner, speed sensors, and receiver of FIG. 7.
Figure 9:
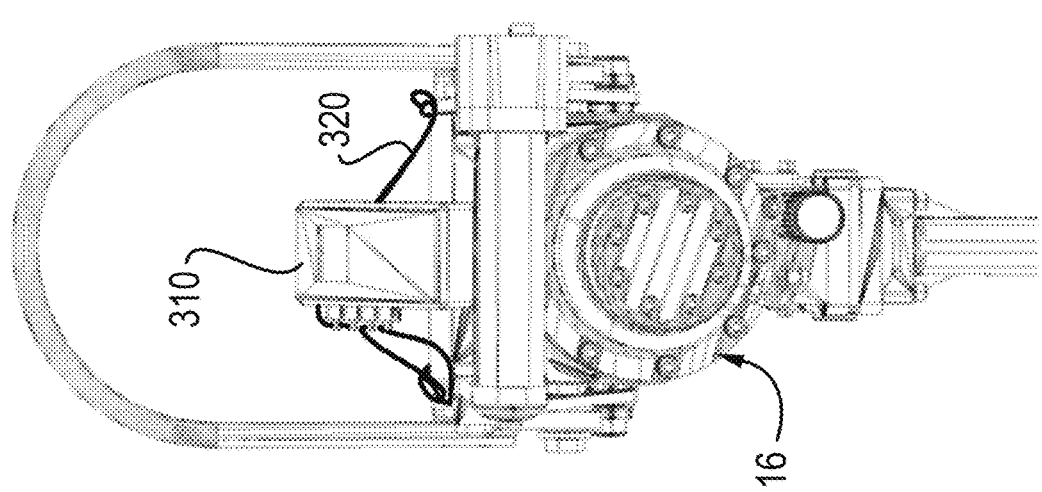
FIG. 9 is a rear view of the animal stunner, speed sensors, and receiver of FIG. 7.
Figure 11:
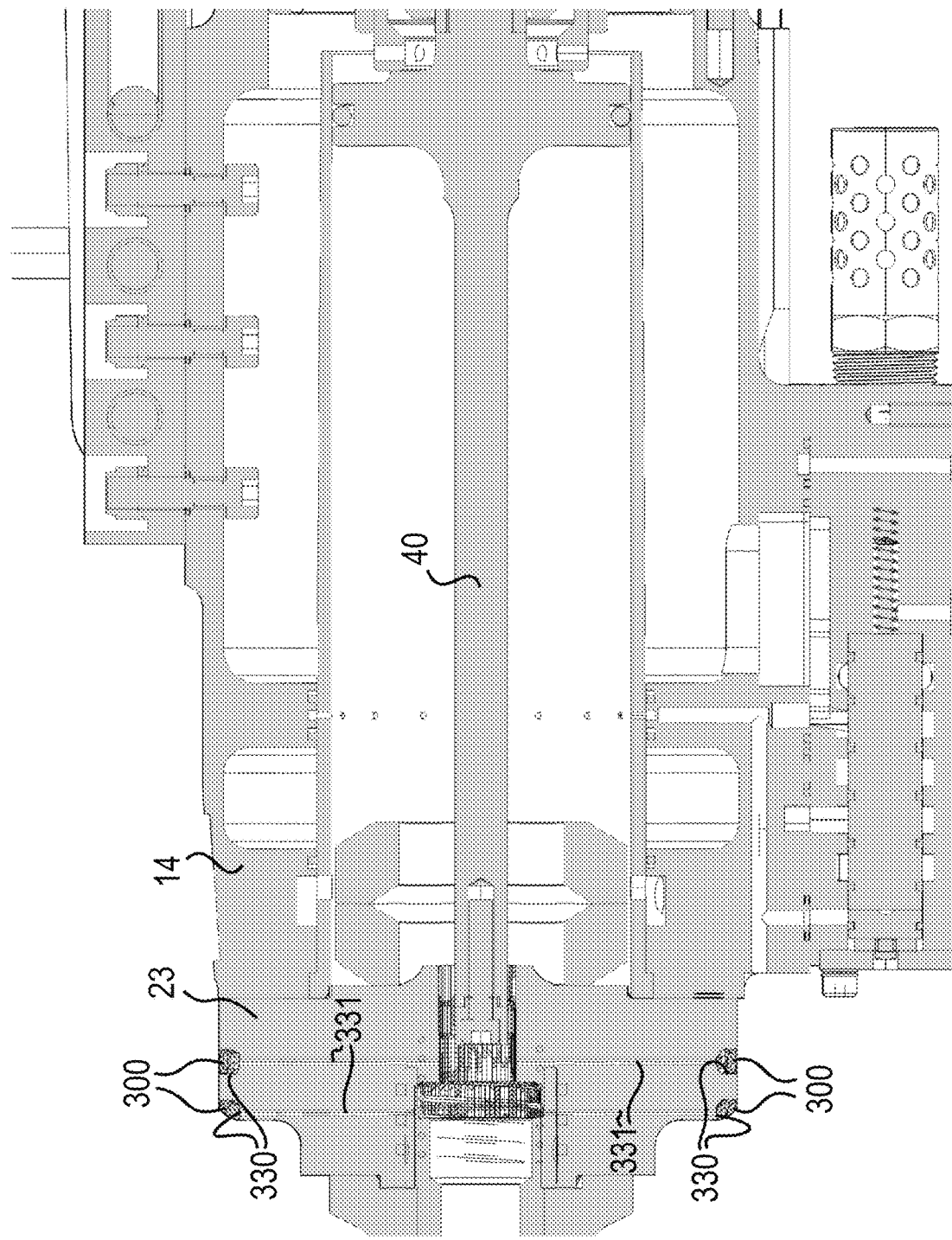
FIG. 11 is a close-up, cross-sectional view of the animal stunner of FIG. 7, showing the inner chamber, stunning rod, and portion of the nose having the speed sensors disposed therein.
Figure 12:
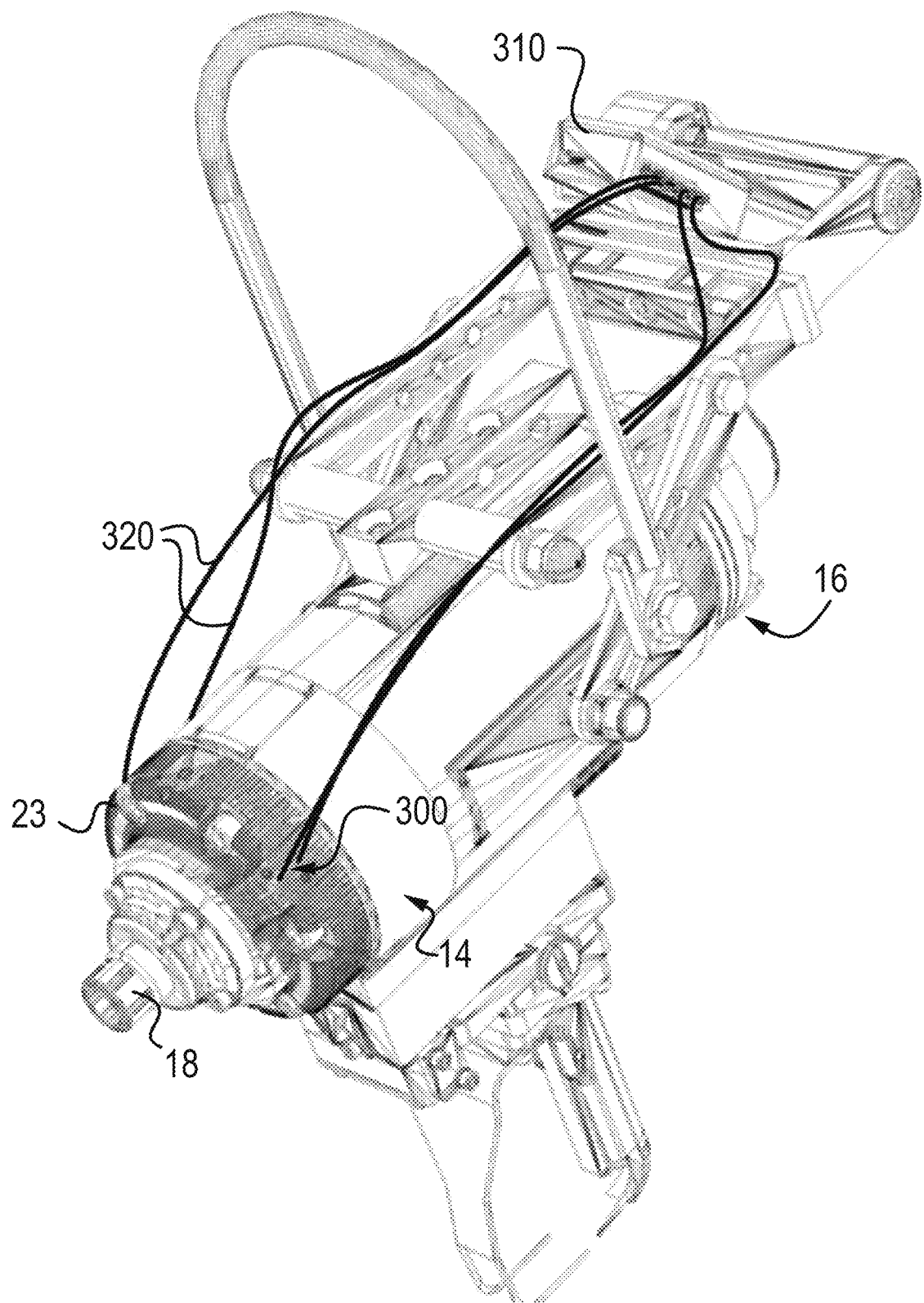
FIG. 12 is a perspective view of the animal stunner, speed sensors, and receiver of FIG. 7.

In describing the embodiment(s) of the present invention, reference will be made herein to FIGS. 1-22 of the drawings in which like numerals refer to like features of the invention.
Structure and Operation of the Stunners Structure and operation of the exemplary animal stunner 10 is shown in general in FIGS. 3-6. The stunner 10 includes an outer elongated hollow housing 12, an outer housing front end 14, a tail end 16, a stunning rod 40 and a catch 20 for holding and releasing the stunning rod 40. The forward and rearward directions described herein are with respect to the stunner front end 14, and inward and outward directions described herein are with respect to the longitudinal axis 42. A piston 48 which may be surrounded by an O-ring seal 66 slides within an inner cylindrical chamber 180 forward and rearward along axis 42, and carries stunning rod 40. O-ring seal 66 is for exemplary purposes only, and other means known in the art to create a pneumatic seal around piston 48 are not precluded. The rearward end of stunning rod 40 ends in an outward extending lip 46 that is alternately held and released by catch 20, and the forward end of the stunning rod extends through head contact 18 to be driven toward the animal's head when the catch releases the stunning rod lip 46.

Stunner 10 may be operated by pressurized fluid, such as (but not limited to) compressed air for the example shown. Outward of and shown as surrounding inner chamber 180 adjacent its central portion and rearward end is annular cylindrical first pressure or fire chamber 170. Compressed air can move freely and quickly between fire chamber 170 to the region of inner chamber 180 behind piston 48 upon operation of main valve 165. Annular cylindrical second pressure or return chamber 175 is also adjacent to, and shown as surrounding inner chamber 180 adjacent its central portion and forward end in the example of FIGS. 3-6. A catch piston chamber 188 is located adjacent and around catch piston 50, which itself holds and releases catch 20. Chambers 170, 175, 180 and 188 may be pressurized to operate the stunner shown, as will be described in more detail below.

A first or main trigger 146 in main handle 136 is used to control a main handle valve 142 to the pressurized fluid, compressed air as used herein, to initiate the sequence that fires the stunning rod. For purposes of safety, to operate the exemplary stunner shown there are two additional conditions that must be met before the catch mechanism for the stunning rod is released. The head contact activator 18 located at the front of the tool must be in contact with the animal to receive the stroke and a second or auxiliary trigger 114 in auxiliary handle 110 must be manually operated. While all three safety features are preferred, it is possible to construct and operate the embodiments of the stunner herein with only one of these three. For optimal safety during operation, at least two safety features, and preferably all three, should be employed.

Figure 14:
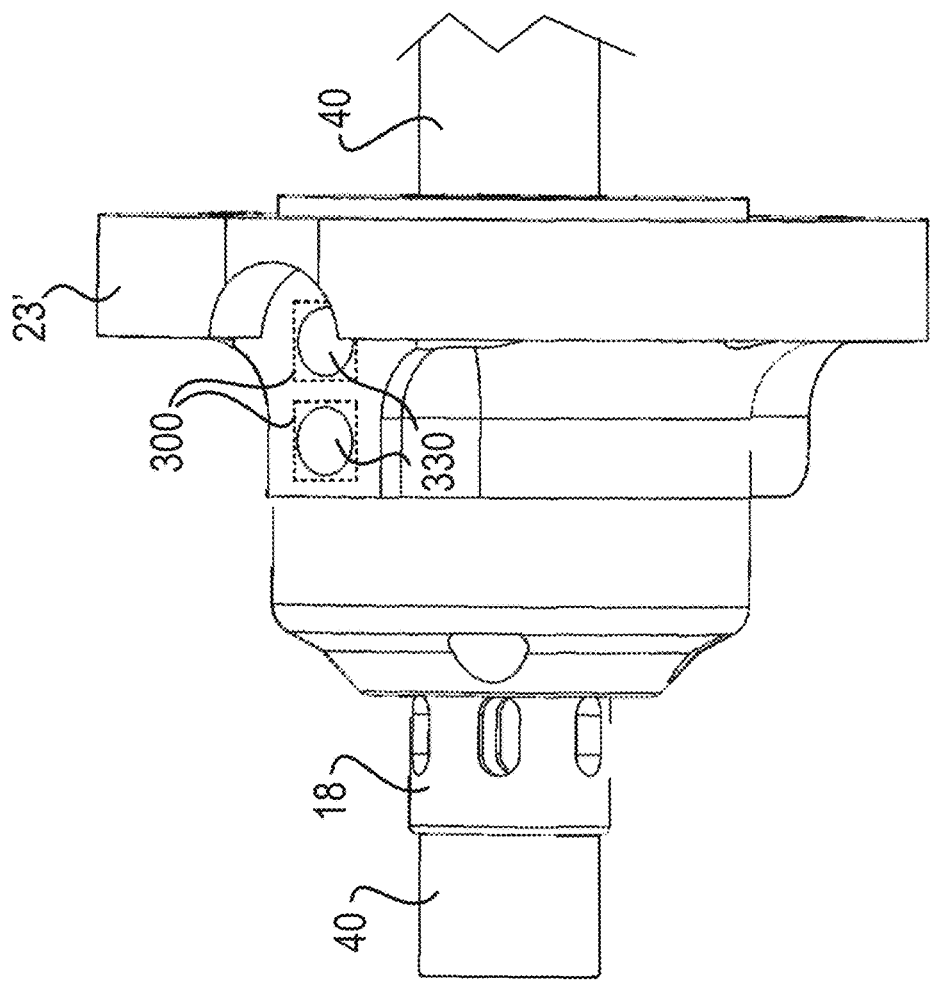
FIG. 14 is another side elevational view of the front end and nose of FIG. 13 with an exemplary stunning rod in the extended position.
Figure 13:
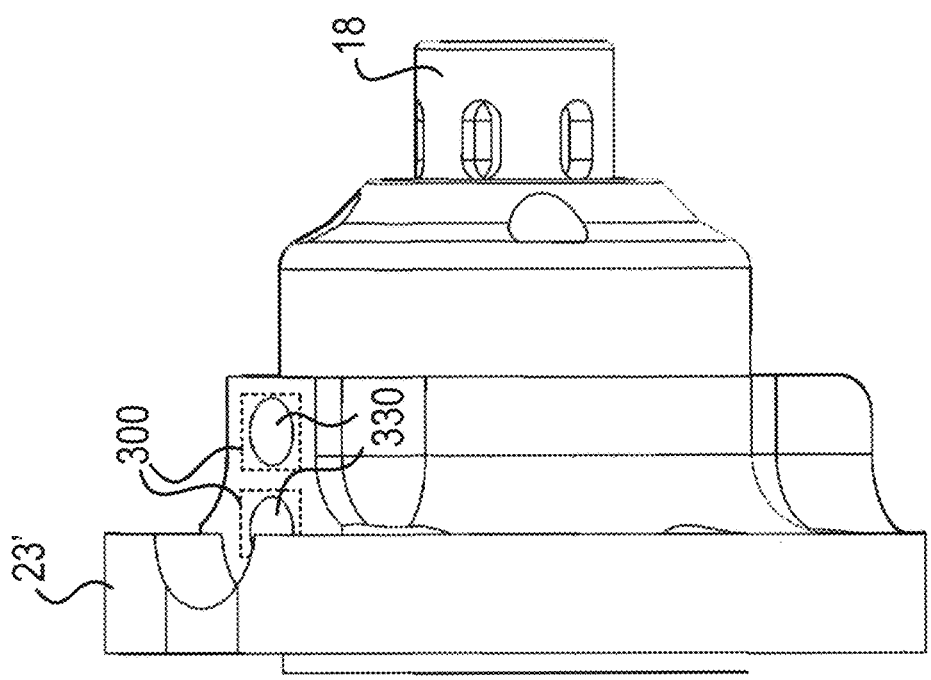
FIG. 13 is a side elevational view of an embodiment of the front end and nose of the animal stunner designed to receive at least one sensor therein, according to the present invention.
Figure 16:
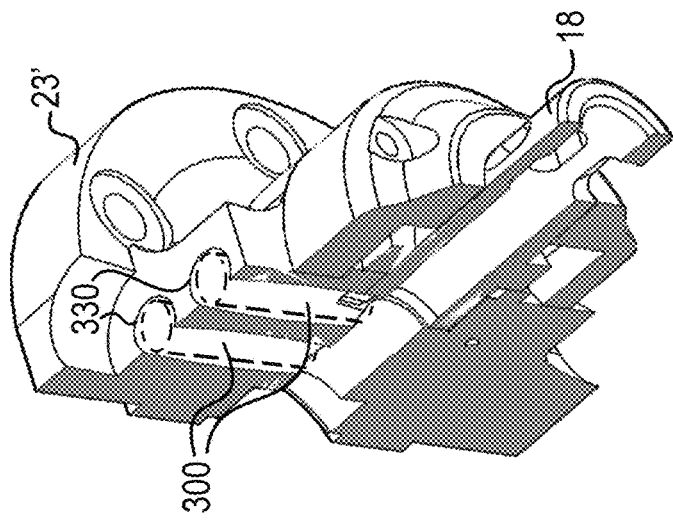
FIG. 16 is a perspective, cross-sectional view of the nose and head contact of FIG. 13.
Figure 17:
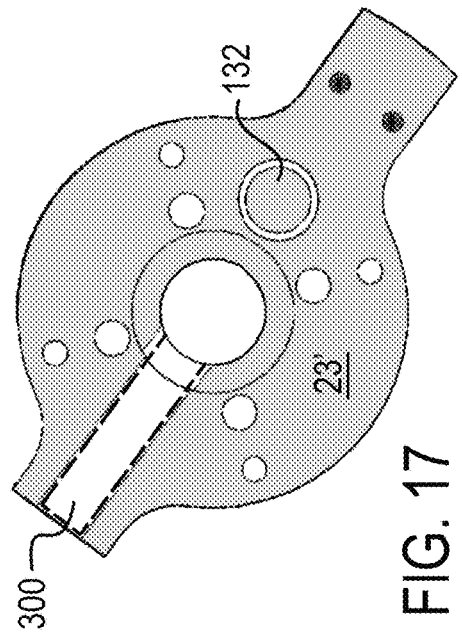
FIG. 17 is a rear, cross-sectional view of the nose and head contact of FIG. 7.
Figure 15:
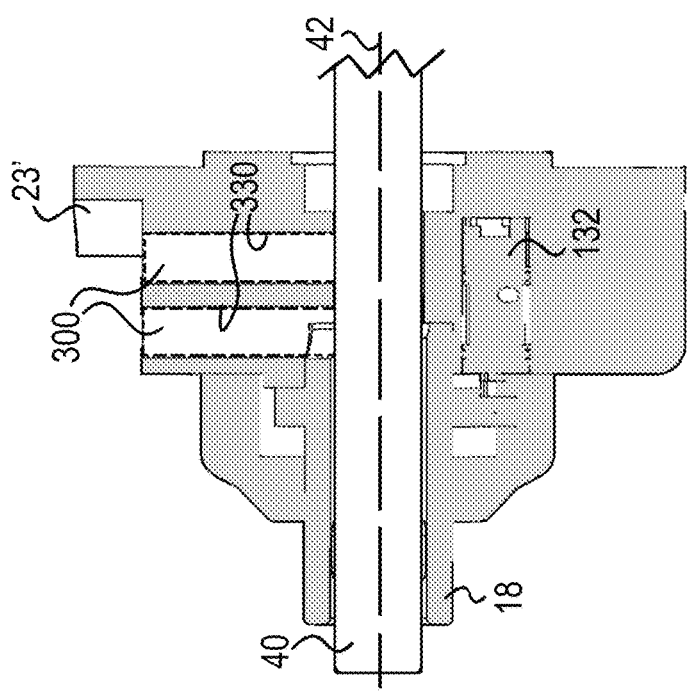
FIG. 15 is a side cross-sectional view of the front end and nose of FIG. 13 with an exemplary extended stunning rod in the extended position.

In an embodiment of the present invention, depression of the optional head contact 18 causes movement of a valve 132 within the stunner nose 23 (shown in FIGS. 14 and 16 for example). As a result of head contact 18 being depressed and upon depression of head contact 18 against an animal head, nose valve 132 is moved from a first position where pressurized fluid may not travel to between passage 182 and 184 to a second position where the nose valve 132 allows fluid communication between these two passages (shown in FIGS. 3-6). In operation, the rod slides in the stunner in a commonly shaped opening within a nose 23 (disposed on front end 14) and the head contact 18 of the stunner. This nose 23 surrounds the stunning rod, and the optional head contact 18, with an opening through which the stunning rod passes. The bore in nose 23, or optional head contact 18, is slightly larger than and conforms to the shape of the stunning rod so as to permit sliding movement in the longitudinal direction.
Structure of the Present Invention (Stunner with Sensors)

Disposed within the nose 23 is at least one sensor 300 facing inwards (i.e. into the housing) such that a portion of the sensor 300 is exposed to the nose 23 and/or head contact 18 opening. In the alternative, the at least one sensor 300 may be disposed anywhere along the length of the stunning rod 40, or within the inner cylindrical chamber 180. As a further alternative, the at least one sensor 300 may be disposed in the tail end 16 of the housing. In such an embodiment, the sensors would track the movement of the piston 48 instead of the stunning rod 40, unlike its nose-sensor counterparts.

In the embodiment shown in FIGS. 7-12, two sensors 300 are disposed within the nose 23 in a radial relationship to each other. In such a radial configuration, each sensor 300 may be disposed with a degree of separation between the range of 1-359 degrees. This radial displacement is beneficial as it prevents the two sensors 300 from electromagnetically interfering with each other. The cross-section shown in FIG. 11 better shows this radial placement of the sensors 300, as they are received within bores 330 formed into the surface of the nose 23. These bores 330 extend into the nose, and decrease in width once past the point of the sensor 300 hardware into a narrower tunnel 331, where such tunnels 331 are sized to allow for a beam to traverse through the nose and be received on the radially opposite side. This embodiment thus allows utilization of the break beam method to measure the speed of the stunning rod 40, the method and associated sensor hardware being described in more detail below and shown in FIGS. 18-21.

In an alternate embodiment of the nose 23' shown in FIGS. 13-16, the two sensors 300 are provided within bores 330 located on the outside surface of and extending into the nose 23', which are placed axially adjacent each other (with respect to the longitudinal axis 42). In one or more embodiments, nose 23' may be of a separate, prefabricated design such that preexisting pneumatic stunners may be retrofit with the sensor technology incorporated in nose 23'. This retrofit technology is advantageous, as it will ensure pneumatic stunners without means to determine proper operating speeds of the stunning rod may be fit with the speed sensor nose design of the present invention to indicate to an operator whether stunning rod speeds are falling below the necessary threshold, and thus help in preventing failure and/or breakdown of preexisting stunners to ensure humane animal deaths. The retrofit technology is also applicable to the nose 23 embodiment (with radially disposed sensors 300) previously described.

The placement of the sensors 300 are for exemplary purposes only, and the sensors 300 may be placed in any location or configuration which would allow the sensor 300 to determine proper operating speeds of the stunning rod 40 within the stunner 10. In some embodiments, the sensors 300 may be located at the rearward end or tail 16 of the stunner 10, such that the sensor determines the speed of the stunning rod 40 within the inner chamber 180. In these embodiments, the sensors can be configured in an axially adjacent manner to each other (along the longitudinal axis 42), or radially (with respect to the surface of the tail end) with a degree of separation between the range of 1-359 degrees.

While the at least one sensor(s) 300 described herein are incorporated within the stunner nose or housing to record the speed of the stunning rod, other placements of the sensors are not meant to be precluded. In some embodiments, one or more sensors 300 may also be incorporated within the safety features, e.g. main trigger 146, auxiliary trigger 114, or head contact 18. In these embodiments, the at least one sensor 300 will measure the movement speed of the stunning rod described herein upon the initial actuation/depression of the trigger or head contact by the operator which corresponds to the initial release of the stunning rod 40 within the inner chamber 180. By incorporating the sensor within the trigger or actuation elements of the stunner, the at least one sensor may measure the movement speed of the stunning rod the instant it is released by the catch 20.

When the stunner is fired, the stunning rod 40 will pass through the head contact 18 opening in the forward end 14 of the stunner in view of the one or more sensors 300. The sensor(s) subsequently measures the movement speed of the stunning rod 40, the method of such which is described in greater detail below. This data is then transmitted to a monitor, sender, receiver or display 310, such as a cell phone, computer, processor, or other media generator (collectively the "receiver 310"), via a wireless (e.g. Bluetooth) or hard-wired connection. The receiver 310 may either be a unit separate and distanced from the stunner, or may be directly affixed to the stunner housing. In hard-wired embodiments (such as in FIGS. 7-12), the at least one sensor 300 may connect to the receiver 310 via an electrical cable 320, which may be a fiber-optic cable, an Ethernet cable, or any other type of cable suitable for communication between the at least one sensor 300 and the receiver 310. While FIGS. 7-12 depict the electrical cable 320 on the exterior of the stunner 10, in other embodiments the electrical cable 320 connecting receiver 310 may be located within the stunner housing 12, to prevent damage to the electrical cable during operation of the stunner. Furthermore, the electrical cable 320 is for exemplary purposes only, and other means of sending an electrical signal to the receiver 310 are not meant to be precluded.

The receiver 310 may be a separate component of the stunner 10 or may be integral with the stunner. As shown in at least FIG. 7, receiver 310 is connected to the auxiliary handle 110 of the stunner for easy display by the stunner operator, although other placement locations of the receiver 310 on the stunner 10 are not meant to be precluded. Receiver 310 may be placed in any location which would allow the operator to view proper operating speeds of the stunning rod within the stunner, such anywhere along the housing 12, including the housing rearward end 16, or forward end 14. Similarly, placement of the receiver 310 may include the main handle 136, particularly in stunner embodiments which may not include the second or auxiliary trigger 114.

Method of Using the Present Invention

FIGS. 18-21 demonstrate a method of measuring the speed of the stunning rod 40 via the at least one sensor 300, which is typically referred to as a "break beam method." In FIG. 18, each of the sensors 300 are composed of an emitter 302 and a beam receiver 304. The emitter 302 emits a beam of electromagnetic radiation or light 306 which may be, for example, visible light, infrared, or ultraviolet. Beam 306 is then received by the beam receiver 304, which sends a signal to the receiver 310 disposed on the surface of, or within the stunner housing. The emitter 302 and beam receiver 304 work in tandem, such that when an object passes between them (thereby severing the beam), an event is registered with the receiver 310 to signal an input. While the present invention as shown in FIGS. 7-17 utilizes a pair of sensors 300, the diagrams of FIGS. 18-21 are for exemplary purposes only. It should be understood by those skilled in the art that the invention could use more than two sensors, or even a single sensor in order to determine the speed of the stunning rod.

Turning now to FIG. 19, the catch of the stunning rod has been released and the stunning rod has begun to move from a retracted position towards the extended position along the longitudinal axis 42. As shown, the opening in which the stunning rod 40 travels has two sensors 300 of known distance, each having the emitter/beam receiver interaction described above. As the stunning rod 40 travels through the first beam 306 between the emitter 302 and the beam receiver 304, the first beams connection to the receiver is severed, causing an initial event. This initial event is recorded by the receiver 310 (using its processing abilities) as the stunning rod 40 continues along the path of travel, toward the extended position, as shown in FIG. 20. Once the stunning rod passes the second beam (see FIG. 21), a second input signal is sent to the receiver 310. The receiver 310 then calculates the speed at which the stunner rod 40 has traveled, dividing the distance between the two sensors 300 by the time between the first and second event input. This data is then sent to the receiver 310 for relay/display to the end user in accordance with the above disclosure. Thus, a user may assess whether the stunning rod is operating at acceptable speeds to ensure humane stunning of animals, thereby eliminating the risk of failure during a first stun attempt.

The break beam method diagrammed in FIGS. 18-21 demonstrated superior performance consistencies in dirty, dusty, and bloody conditions akin to those within animal processing plants. In the alternative, an embodiment of the present invention may utilize a reflected light method to determine the proper operating speeds of the stunning rod within the stunner described below. In this embodiment, the sensor(s) 300 include a light emitting element 312 and a light receiving element 316, as shown in FIG. 22. The light emitting element 312 sends a ray of light 314, which is only received by the light receiving element (thereby registering an event input) when the light ray is reflected from the surface of the object being measured (stunning rod 40 in this example). Once the light receiving element 316 receives an event input, the event is recorded by the receiver 310 to calculate the speed of the stunning rod in a similar manner as the break beam method. Though the reflected light method was shown to be less efficient than its break beam counterpart in dirty, dusty and bloody conditions, the reflected light method demonstrated its own unique advantages by presenting less design complexity, resulting in an easier and more cost-effective integration with the pneumatic stunner.

Details of the Sensor Technology

The at least one sensor 300 may be mechanical, i.e., making contact with the moving stunning rod; optical, i.e., viewing the moving stunning rod; magnetic, i.e., sensing the field of the moving stunning rod; a proximity sensor that emits either an electromagnetic field or a beam of electromagnetic radiation (i.e. lasers); or any other type of sensor. The sensor gives speed results after every shot as the stunning tool is being used. In this manner the operators would have real time speed data, in order to take the tool offline before major issues would cause a faulty stun and/or damage to the stunner itself. The sensor would ensure proper performance, i.e., stunning rod speed, while the stunner is being used during the work day.

Multiple types of sensors were tested to determine their accuracy and consistency in measuring the speed of the stunning rod as it extended and retracted within the stunner housing. The types of sensors observed included a visible light fiber optic sensor, a focused laser transmitter and photodiode sensor, an infrared light sensor, and an inductive proximity sensor. While each type of sensor may effectively be used in the present invention due to the unique advantages each type of sensor presented, it was found that some sensors held benefits and stronger consistency measurements over others.

Buildup of debris (e.g. fur, dust, bodily fluids, etc.) within and around the stunner housing and on the stunning rod is a common issue in the field. When testing the sensors, it was found that these issues also hindered the accuracy of speed measurements, with some sensors being subject to greater accumulating inaccuracies over time than others. Table 1 below depicts the average results and standard deviation from testing of the different sensors 300 using the break beam method over the course of twenty (20) trials, as diagrammed in FIGS. 18-21 and previously described:

| Trial | Broadcom Fiber Optic Sensor | Infrared Gate Sensor | Inductive Proximity Sensor | Laser and Photocell Sensor | Control Sensor (AST 106) |
|---|---|---|---|---|---|
| Avg. | 23.21 | 23.68 | 20.802 | 22.487 | 23.728 |
| Std. Deviation | 0.44 | 2.94 | 1.77 | 0.64 | 0.61 |

In these tests, an object was dropped from a location ten feet directly above the sensor, using only gravitational forces to generate the object's speed to be measured. Under this theory, the measured speed should be fairly consistent across twenty separate trials, with the measured speeds of each trial being fairly precise to one another.

The results of these tests showed that the light fiber optic, and focused laser and photodiode sensors were the most consistent in their speed measurements, as both sensors achieved a standard deviation of less than 1 foot per second across the average of 20 separate speed measurement trials. The infrared light, and inductive proximity sensors yielded higher standard deviation measurements, but these types of sensors are still considered to be acceptable for purposes of the present invention, and may still be integrated with the stunner of the present invention.

While the sensor and method of determining the speed of the stunning rod within the stunner described herein incorporate the usage of light-based sensors, these are for exemplary purposes only, and other sensors which can indicate to an operator whether a stunning rod speed is falling below a necessary threshold to ensure proper stunning operations are not meant to be precluded, such as sensors which determine internal pressure values of the stunner. In these embodiments, the sensor(s) 300 can detect and record an event based on a parameter or property other than time which may be processed by the receiver 310 to correlate to proper stunning rod speed within the stunner to ensure proper working and stunning conditions. It should be understood by a person skilled in the art that the present invention may utilize any sensor capable of sensing and/or measuring a parameter or property to determine/calculate stunning rod speed after each use so as to help in preventing failure and/or breakdown of the tool and ensuring humane animal deaths.

Thus, the present invention provides one or more of the following advantages: 1) an improved animal stunner capable of quickly and accurately measuring the movement speed of a stunning rod as it is fired; 2) an improved animal stunner with wireless data transmission capabilities for a speed sensor; 3) an improved animal stunner that is able to measure stunning rod speed to provide proper effectiveness in stunning and killing animals; 4) an improved animal stunner that is able to measure stunning rod speed to reduce the potential for breakdown of or damage to the stunner; and/or 5) an improved animal stunner that operates to ensure humane animal deaths.

While the present invention has been particularly described, in conjunction with one or more specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A sensor system for a pneumatic animal stunner, comprising:
 a housing having a front end;
 an inner chamber in the housing having a forward end and a rearward end, said inner chamber extending along a length of the housing;
 a nose disposed on the housing front end, the nose including an opening in communication with the inner chamber, the nose including at least one bore formed in an outer surface of the nose at a distance from and perpendicular to the nose opening, said at least one bore having a tunnel extending into the nose and including a tunnel opening in a surface of the nose opening;
 a piston slideable within the inner chamber;
 a stunning rod within the housing and capable of being driven by the piston forward towards the front end of the housing to an exterior of the stunner and rearward away from the front end of the housing; and
 at least one beam sensor disposed within the at least one bore adjacent the tunnel and removed from the nose opening, the at least one beam sensor being in communication with a receiver;
 wherein the at least one beam sensor emits a beam into the tunnel and through the nose opening to a surface diametrically opposed from the tunnel opening;
 wherein the at least one beam sensor measures an event to determine a movement speed of the stunning rod as it is driven forward by the piston towards the front end of the housing, and further transmits said movement speed to the receiver for display.

2. The stunner sensor system of claim 1 wherein the receiver is a separate unit from the pneumatic animal stunner.

3. The stunner sensor system of claim 1 wherein the receiver is integral to the pneumatic animal stunner.

4. The stunner sensor system of claim 1 wherein the at least one beam sensor is an optical or proximity sensor.

5. The stunner sensor system of claim 1 wherein the at least one beam sensor is a proximity sensor, wherein said proximity sensor emits either an electromagnetic field or a beam of electromagnetic radiation.

6. The stunner sensor system of claim 1 wherein the at least one beam sensor is a visible light fiber optic sensor, a focused laser transmitter and photodiode sensor, an infrared light sensor, or an inductive proximity sensor.

7. The stunner sensor system of claim 1 wherein the nose comprises a plurality of bores, each of the plurality of bores including at least one beam sensor.

8. The stunner sensor system of claim 7 wherein the plurality of bores are disposed adjacent to each other on a shared longitudinal axis.

9. The stunner sensor system of claim 7 wherein the plurality of bores are disposed radially on the nose.

10. The stunner sensor system of claim 1 wherein the event measured by the at least one beam sensor is a change in time.

11. The stunner sensor system of claim 1 wherein the at least one beam sensor is a break beam sensor.

12. The stunner sensor system of claim 1 wherein the at least one beam sensor is a reflective light sensor.

13. A method of sensing the speed of a stunning rod of a pneumatic animal stunner, comprising:
providing a housing having a front end, an inner chamber in the housing having a forward end and a rearward end, said inner chamber extending along a length of the housing, a piston slidable within the inner chamber, a stunning rod within the housing and capable of being driven by the piston forward and rearward towards and away from the front end of the housing, a nose disposed on the housing front end the nose including an opening in communication with the inner chamber, the nose including at least one bore formed in an outer surface of the nose at a distance from and perpendicular to the nose opening, said at least one bore having a tunnel extending into the nose and including a tunnel opening in a surface of the nose opening, and at least one beam sensor disposed within the at least one bore adjacent the tunnel and removed from the nose opening, the at least one beam sensor being in communication with a receiver;
emitting a beam from the at least one beam sensor into the tunnel and through the nose opening to a surface diametrically opposed from the tunnel opening;
firing the stunning rod to drive it forward towards the front end of the housing;
measuring a movement speed of the stunning rod via the at least one beam sensor; and
transmitting the movement speed to the receiver in communication with said at least one beam sensor.

14. The method of claim 13 wherein the at least one beam sensor comprises a plurality of beam sensors and the step of measuring the movement speed of the stunning rod is conducted via the plurality of beam sensors.

15. The method of claim 14 wherein the nose comprises a plurality of bores, each of the plurality of bores including one of the plurality of beam sensors, the plurality of bores disposed radially on the nose.

16. The method of claim 14 wherein the nose comprises a plurality of bores, each of the plurality of bores including one of the plurality of beam sensors, the plurality of bores axially placed on the nose.

17. The method of claim 14 wherein the step of measuring the movement speed of the stunning rod further includes measuring a first event signal, subsequently measuring a second event signal, and using said first event signal and said second event signal to determine said movement speed of the stunning rod.

18. The method of claim 13 wherein the step of transmitting the movement speed to the receiver is achieved via a wireless connection.

19. The method of claim 13 wherein the step of transmitting the movement speed to the receiver is achieved via a wired connection.

20. The method of claim 19 wherein the wired connection is via a fiber-optic cable.

21. The method of claim 13 further including measuring the movement speed of the stunning rod via the at least one beam sensor by employing a break beam method.

22. The method of claim 13 further including measuring the movement speed of the stunning rod via the at least one beam sensor by employing a reflected light method.

23. A stunner nose for determining the speed of a stunning rod, the stunner nose for installation on a stunner comprising a housing having a front end, a rear end, and an opening therethrough, said opening having a stunning rod disposed therein and slidable within said stunner housing between said front end and said rear end, the stunner nose comprising:
a nose opening in communication with the stunner opening;
a bore formed on an outside surface of the nose at a distance from and perpendicular to the nose opening, said bore having a tunnel extending into the nose opening and including a tunnel opening in a surface of the nose opening; and
a beam sensor within the bore adjacent the tunnel and removed from the nose opening, said beam sensor emitting a beam into the nose opening, the beam sensor capable of detecting movement of said stunning rod moving within the stunner after said stunner nose is installed on the stunner;
wherein the at least one beam sensor emits a beam into the tunnel and through the nose opening to a surface diametrically opposed from the tunnel opening;
wherein the beam sensor records an event to determine the movement speed of the stunning rod as it is driven forward within the stunner in view of the beam sensor, and further transmits the movement speed to a receiver for display.

24. The stunner nose of claim 23 wherein the nose outside surface includes a second bore adjacent to said bore for receiving a second beam sensor therein.

25. The stunner nose of claim 23 wherein the beam sensor is a break beam sensor.

26. The stunner nose of claim 23 wherein the beam sensor is a reflective light sensor.

27. The stunner nose of claim 23 wherein the nose outside surface includes a second bore radially disposed with respect to said bore for receiving a second beam sensor therein.

* * * * *